United States Patent [19]

Fujito et al.

[11] Patent Number: 4,657,128

[45] Date of Patent: Apr. 14, 1987

[54] CLUTCH COOLING DEVICE

[75] Inventors: Nobutoshi Fujito, Neyagawa; Hiroshi Takeuchi, Higashi-Osaka, both of Japan

[73] Assignee: Kabushiki Kaisha Daikin Seisakusho, Osaka, Japan

[21] Appl. No.: 708,614

[22] Filed: Mar. 5, 1985

[30] Foreign Application Priority Data

Mar. 6, 1984 [JP] Japan ............................. 59-32467[U]

[51] Int. Cl.[4] .............................................. F16D 13/60
[52] U.S. Cl. .............................. 192/113 A; 192/70.12
[58] Field of Search ............. 192/113 A, 113 R, 70.12

[56] References Cited

U.S. PATENT DOCUMENTS

| 1,601,235 | 9/1926 | Bullard, Jr. et al. | 192/70.12 |
| 1,731,416 | 10/1929 | Gurney | 192/113 A |
| 1,983,885 | 12/1934 | Spase | 192/70.12 |
| 3,340,974 | 9/1967 | Maucher | 192/113 A X |
| 3,707,211 | 12/1972 | Kuno | 192/89 B X |

Primary Examiner—George H. Krizmanich
Attorney, Agent, or Firm—Armstrong, Nikaido, Marmelstein & Kubovcik

[57] ABSTRACT

A clutch cooling device comprising a plurality of cooling fins at the inner peripheral end of a clutch cover which houses a pressure plate and a facing, said cooling fins inclined toward the inner side of said clutch cover from the forward side to the rearward side in the rotation direction of said cover.

7 Claims, 8 Drawing Figures

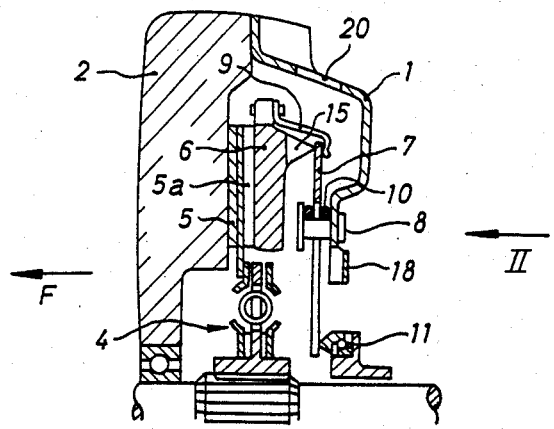
FIG. 1
FIG. 3
FIG. 2
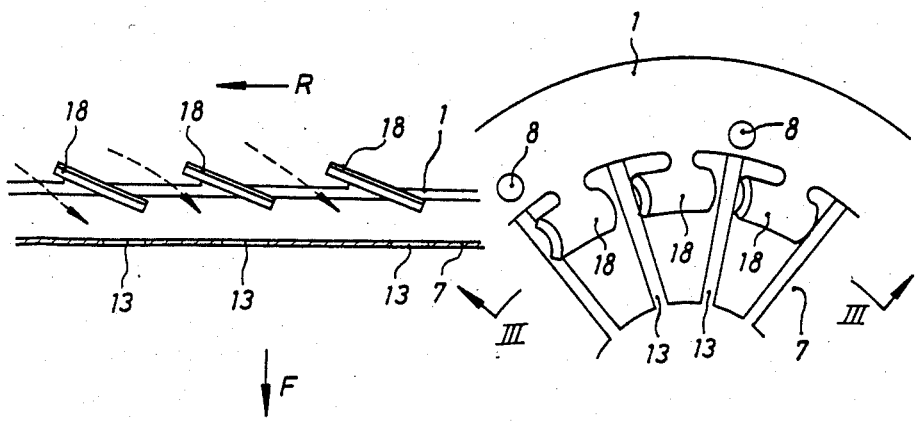

CLUTCH COOLING DEVICE

BACKGROUND OF THE INVENTION

1. Industrial Useful Field

The present invention relates to a cooling device for clutch means such as a single-plate clutch or multi-plate clutch means having a pressure plate and facing for a clutch disk.

2. Prior Art

A conventional clutch means is not provided with a cooling device for forcibly cooling a pressure plate or the like. When such conventional clutch means is engaged, friction heat is produced between the pressure plate and the facing. Such friction heat causes torque transmission to be unstable and disadvantageously deteriorates the hardwearing properties and durability of the facing.

OBJECT OF THE INVENTION

It is an object of the present invention to forcibly cool the pressure plate of a clutch means by utilizing the rotation of the clutch cover, thereby to improve the stability in torque transmission and the hardwearing properties and durability of the facing.

In order to achieve the object above-mentioned, the present invention includes a plurality of cooling fins at the inner peripheral end of a clutch cover which houses a pressure plate and a facing, these fins being inclined toward the inner side of the cover from the forward side to the rearward side in the cover rotation direction.

BRIEF DESCRIPTION OF THE DRAWINGS

FIG. 1 shows the upper half portion of a longitudinal section view of a first embodiment of the present invention.

FIG. 2 is an enlarged view taken from the direction of the arrow II in FIG. 1.

FIG. 3 is a section view taken along the line III—III in FIG. 2.

DETAILED DESCRIPTION OF THE INVENTION

(Embodiment 1)

Figure 6:
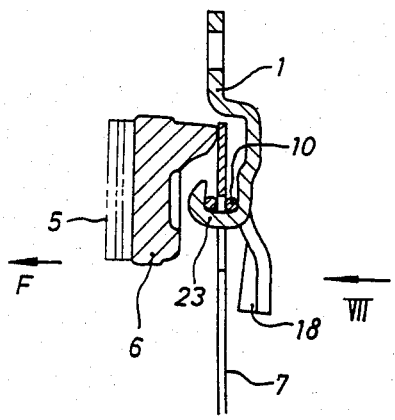
FIG. 6 shows the upper half portion of a longitudinal section view of a third embodiment of the present invention.

FIG. 1 shows the upper half portion of a longitudinal section view of a clutch means to which the present invention is applied. A clutch cover 1 is secured at the outer peripheral end thereof to a flywheel 2, and is rotated integrally therewith. The flywheel 2 is connected to the output shaft of an engine. Inside of the clutch cover 1 or between the flywheel 2 and the clutch cover 1, there are disposed a facing 5 for a clutch disk 4, a pressure plate 6 and a diaphragm spring 7 which are arranged in this order from the flywheel 2 side.

The pressure plate 6 is connected to the clutch cover 1 through a plurality of strap plates (not shown), and is axially movable with respect to the clutch cover 1. Stud pins 8 for supporting wire rings 10 are disposed at regular intervals in the circumferential direction.

The diaphragm spring 7 is connected at the outer peripheral end thereof to the pressure plate 6 at the outer peripheral end thereof through a clip 9. The inner peripheral end of the spring 7 comes in contact with a release bearing 11. The diaphragm spring 7 is supported by a pair of wire rings 10. With the annular portions of the spring 7 in contact with the wire rings 10 serving as fulcrums, the outer and inner peripheral ends of the spring 7 are oppositely movable in the axial direction.

The description will then be made on a cooling device in the clutch cover 1.

As shown in FIG. 3, disposed at the inner peripheral ends of the clutch cover 1 are at least two cooling fins 18 inclined toward the inner side (the arrow F side) from the forward side to the backward side in the rotation direction R of the cover 1. The fins 18 are formed integrally with the cover 1 and are arranged at intervals in the circumferential direction. The fins 18 are formed such that their rear ends are located substantially at positions corresponding to the notches 13 of the spring 7.

As shown in FIG. 2, the notches 13 of the spring 7 are radially formed. The cover 1 in FIG. 1 has an exhaust hole 20 in the outer peripheral end thereof.

(Function of the Invention)

When the clutch means is engaged, the facing 5 is pressingly held between the pressure plate 6 and the flywheel 2, and power is transmitted from the flywheel 2 to the clutch disk 4.

The fins 18 rotated integrally with the clutch cover 1 allow the open air to enter from the outside of the cover 1 into the inside thereof as shown by arrows (dotted lines). The air then passes through the notches 13 formed in the radial shape, and is supplied to the pressure plate 6 and the facing 5, thereby to forcibly cool the plate 6 and the facing 5.

After having cooled the plate 6 and the facing 5, the air passes between fulcrum 15 of the pressure plate 6 and a longitudinal groove 5a of the facing 5 by centrifugal force, and reaches the outer peripheral side of the clutch cover 1. The air is then discharged outside through the exhaust hole 20.

(Embodiment 2)

Figure 4:
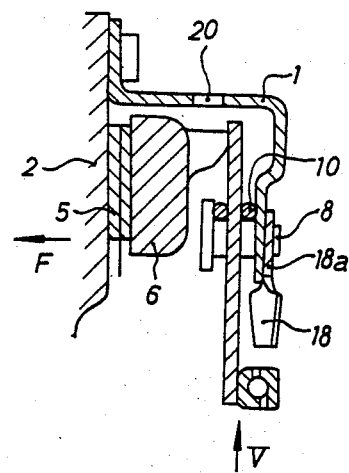
FIG. 4 shows the upper half portion of a longitudinal section view of a second embodiment of the present invention.
Figure 5:
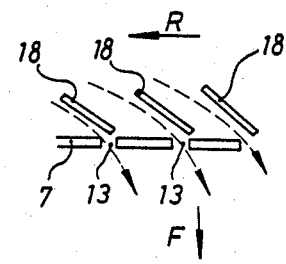
FIG. 5 is a development view taken from the direction of the arrow V in FIG. 4.

In the embodiment shown in FIG. 4, a plurality of fins 18 separate from the cover 1 are secured to the cover 1 at its inner peripheral end with stud pins 8. As shown in FIG. 5, these fins 18 are also inclined toward the inner side (the arrow F side) of the cover 1 from the forward side to the rearward side in the rotation direction R of the cover 1. The fins 18 are formed integrally with annular support plates 18a in FIG. 4, which are secured to the cover 1 with stud pins 8. The fins 18 are disposed at intervals in the circumferential direction.

In FIGS. 4 and 5, like parts are designated by like numerals used in FIGS. 1 to 3.

(Embodiment 3)

Figure 7:
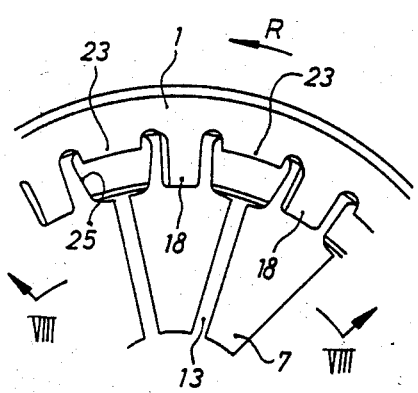
FIG. 7 is a view taken from the direction of the arrow VII in FIG. 7.
Figure 8:
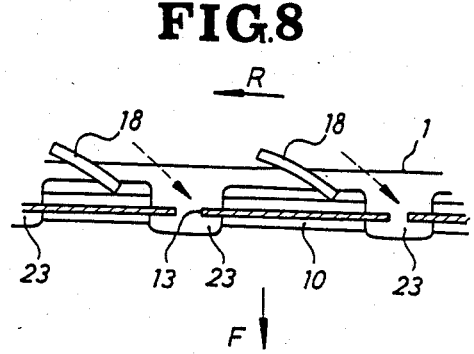
FIG. 8 is a section view taken along the line VIII—VIII in FIG. 7.

FIGS. 6, 7 and 8 show an embodiment in which the present invention is applied to a so-called D.S.T. type clutch means. The D.S.T. type clutch means is that in which, without the use of stud pins, wire rings 10 are supported by hook portions 23 which are formed at the inner peripheral end of the cover 1 as projecting to the inner side (the arrow F side) and being turned upward. As shown in FIG. 7, the hook portions 23 are located at positions corresponding to through-holes 25 in the diaphragm spring 7.

As shown in FIG. 7, the fins 18 in this embodiment are formed integrally with the cover 1 between adjacent hook portions 23. It is to be noted that these fins 18 are inclined toward the inner side of the cover 1 from the forward side to the backward side in the rotation direction R of the cover 1, as shown in FIG. 8.

In FIGS. 6 to 8, like parts are designated by like numerals used in FIGS. 1 to 3.

Although the fins 18 are formed between all hook portions 23 in this embodiment, the fins 18 may also be formed between every second or third hook portions 23. It is to be noted that there are disposed at least two fins 18.

(Effect of the Invention)

(1) At the inner peripheral end of the clutch cover 1 which houses the pressure plate 6 and the facing 5, there are formed the cooling fins 18 inclined toward the inner side of the cover 1 from the forward side to the rearward side in the rotation direction R of the cover 1. The fins 18 rotated integrally with the cover 1 may supply the open air to the pressure plate 6 and the facing 5, thereby to forcibly cool the plate 6 and the facing 5. The friction coefficient of the facing 5 is therefore stabilized with the durability and the hardwearing properties of the facing improved.

(2) Torque transmission is stabilized to reduce the area of the facing 5, thereby to reduce the clutch dimensions in the radial direction.

What is claimed is:

1. In a clutch having a flywheel for rotation about an axis,
    a clutch cover secured at its outer peripheral end in fixed position on said flywheel for rotation with said flywheel about said axis,
    a pressure plate in said cover in axial alignment with said flywheel and movable in an axial direction toward and away from said flywheel,
    an output shaft in axial alignment with said flywheel,
    a clutch disk between said flywheel and said cover and splined to said output shaft,
    a diaphragm spring connected at its outer peripheral end to said pressure plate and engagable at its inner peripheral end with a release bearing mounted for axial movement relative to said output shaft,
    a plurality of fulcrum means mounted on said cover and extending through said diaphragm spring intermediate said peripheral outer and inner ends of said diaphragm spring for supporting said diaphragm spring for axial movement about said fulcrum for moving said pressure plate axially away from said flywheel to release said clutch disk from said flywheel and said pressure plate when said release bearing is moved axially toward flywheel and for engaging said clutch disk between said flywheel and said pressure plate when said release bearing is moved axially away from said flywheel,
    the inner end of said diaphragm spring from said fulcrum means to said inner peripheral end engagable with said released bearing having a plurality of equally spaced radially extending notches passing through said diaphragm spring and forming radially extending spring fingers for resilient engagement with said release bearing therebetween,
    a cooling device for said clutch, said cooling device comprising a plurality of cooling fins at the inner peripheral end of said clutch cover,
    said cooling fins being inclined in the axial direction of said clutch cover, said pressure plate and said clutch disc from the side of said clutch cover remote from said pressure plate to the side of said clutch cover adjacent said pressure plate in the direction of rotation of said flywheel and said pressure plate,
    said cooling fins being intermediate said radially extending notches and extending circumferentially across said spring fingers for drawing air for cooling from the outside of said clutch housing, when said flywheel is rotating, and forcing said air through said radially extending notches to the faces of said flywheel, said pressure plate and said clutch disk and
    air discharge holes in said clutch housing, spaced around said housing radially outward of said flywheel, pressure plate and clutch disk for discharging said air.

2. A clutch cooling device as set forth in claim 1, wherein the ends of said cooling fins at the side of said clutch cover adjacent said pressure plate are located at said notches formed in said diaphragm spring.

3. A clutch cooling device as set forth in claim 1, wherein said cooling fins are formed integrally with said clutch cover.

4. A clutch cooling device as set forth in claim 1, wherein the ends of said cooling fins at the side of said clutch cover adjacent said pressure plate are located at said notches formed in said diaphragm spring, and said cooling fins are formed integrally with said clutch cover.

5. In a clutch as recited in claim 1 wherein said fulcrum means are stud pins mounted on said clutch cover and said diaphragm spring is supported for fulcrum movement on said stud pins by wire rings extending circumferentially around said output shaft on said pins at the opposite sides of said diaphragm spring.

6. A clutch cooling device as set forth in claim 5, wherein said cooling fins are formed integrally on annular support plates separate from said clutch cover, and said annular support plates are secured to said clutch cover by said stud pins.

7. In a clutch as recited in claim 1 wherein said fulcrum means are hook portions at the inner peripheral end of said cover and extending inwardly toward said pressure plate intermediate said cooling fins through said diaphragm spring and said diaphragm spring is supported for fulcrum movements on said hook portions by wire rings extending circumferentially around said output shaft on said pins at the opposite sides of said diaphragm spring.

* * * * *